July 5, 1932.  J. W. ALLEN  1,865,999
ELECTRICAL THERMOMETER
Filed Aug. 28, 1924
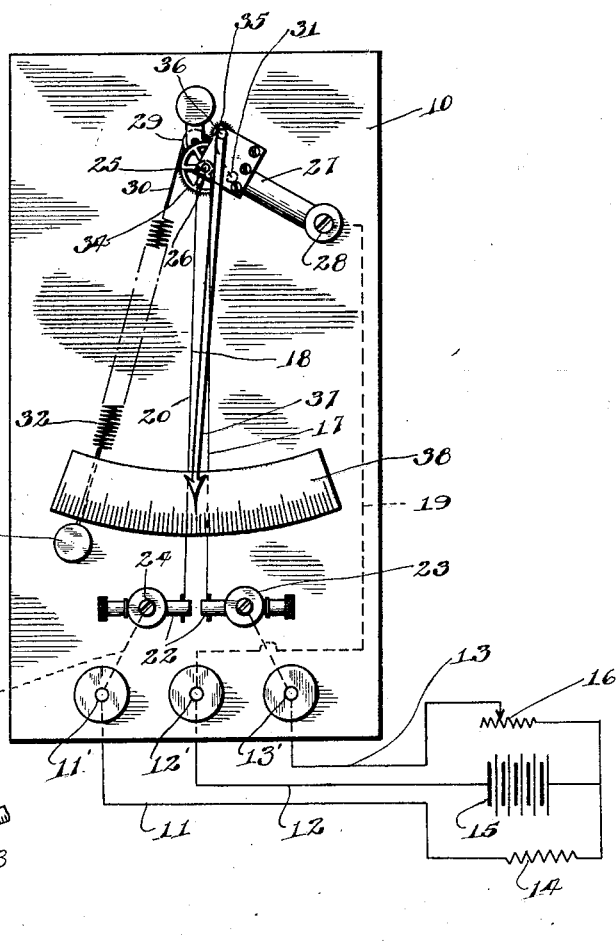
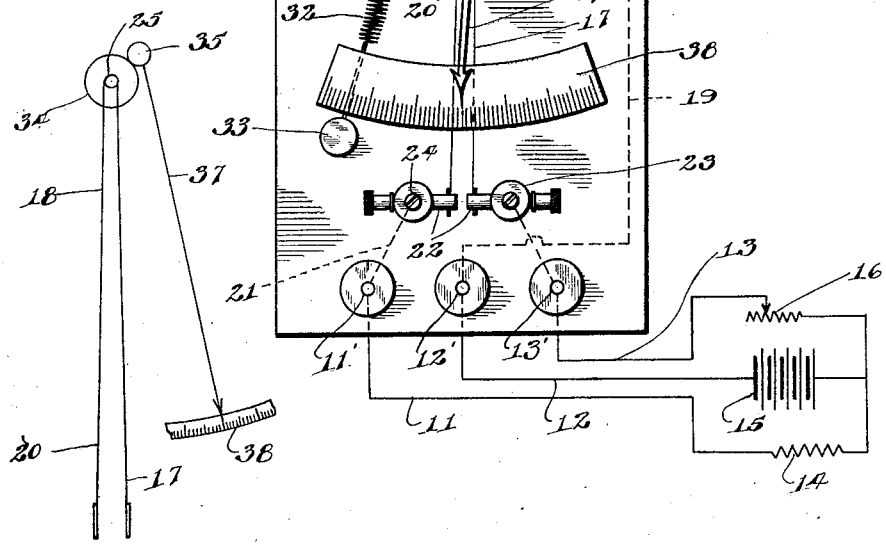
INVENTOR
Joseph W. Allen
BY Robert H. Young
ATTORNEY Patented July 5, 1932

1,865,999

UNITED STATES PATENT OFFICE

JOSEPH W. ALLEN, OF DAYTON, OHIO

ELECTRICAL THERMOMETER

Application filed August 28, 1924. Serial No. 734,817.

This invention relates to electrical heat measuring devices generally, and while particularly concerned with the provision of a remote indicating electrical thermometer for indicating temperature changes in the cooling water of airplane engines and the like, is capable of adaptation to other forms of devices such as pyrometers and the like.

The principal object of the invention consists in providing a variable resistance affected by temperature changes in the medium under consideration, which is connected in circuit with a conductor, the expansion and contraction of which due to changes in current flow may be measured, and thereby indicate the extent of temperature change to which the variable resistance was subjected. In airplane installations and the like the variable resistance subject to temperature changes is remote from the indicating device.

In the accompanying drawing showing one embodiment of the invention

Fig. 1 is a front view of the instrument together with a circuit diagram.

Fig. 2 is a diagrammatic view of the mechanical movement used in the instrument.

In an airplane installation the instrument 10 will be mouted at some convenient point in the cockpit and will be connected by conductors 11, 12 and 13, on binding posts 11¹, 12¹ and 13¹, with a resistance 14, battery 15, and variable resistance 16 respectively, located at remote points. A similar arrangement would be utilized in the case of an automobile installation and probably would be found desirable in the case of the application of the present invention to use in pyrometers.

The resistance 16 is conveniently in the form of a coil of wire having a relatively high temperature coefficient of resistance, and in the case of an airplane installation will be immersed in the cooling fluid in order to be affected by the temperature changes thereof. The resistance 16 is connected in series with one branch or conductor segment 17 of a wire loop 18, the latter being grounded and connected as indicated by the connection 19 through the conductor 12 with the battery 15. The other branch or conductor segment 20 of the loop 18 is connected as indicated at 21 through the conductor 11 with the resistance 14, which in turn is connected, commonly with the resistance 16, to the battery 15. With this brief description it will be apparent that the current flowing in the branch 17 of the loop 18 is the same as that flowing through the resistance 16. Consequently, upon a change in resistance of the variable resistance 16 due to temperature change there will be a change in the current flow through the branch 17 of the loop 18. The current flow through the branch 20 of the loop 18 remains substantially constant since it is connected in series with the fixed resistance 14. As will be presently described, the instrument indicates by elongation of the loop 18 the extent of temperature change to which the variable resistance 16 is subjected.

The constant current branch is provided so that indications will not be affected by voltage changes. For example—if a voltage increase occurs both branches would carry increased currents. The heating in both branches would therefore be increased equally and hence the pointer would not change position. If the fixed resistance branch were omitted any change of voltage applied would change the current through the heating wire (variable branch) and cause movement of pointer regardless of the fact that temperature of variable branch resistance remains constant. Since it is very desirable to compensate for voltage changes of energy source a branch with fixed resistance is provided and necessary.

The loop 18 is preferably of a very fine wire having a relatively high temperature coefficient of expansion, so that small changes in current flow there-through will produce measurable temperature changes, and thereby produce measurable changes in the overall length of the loop 18 as the wire expands and contracts.

The two free ends of the loop 18 are rigidly fixed to stems 22 adjustable in posts 23 and held by set screws 24. The loop passes over a pulley 25 on a shaft 26 received in bearings in the free end of an arm 27, pivoted at 28 to swing in an arc. A stationarily mounted pulley 29 has a cord 30 passing over the same connected to a stud 31 on the arm 27 to communicate tension to the loop 18, from a coiled spring 32 secured to the free end of the cord 30 at one end and lodged in a post 33 at the other end. The pulley 25 has a gear 34 arranged to turn therewith upon movement of the arm 27 when the wire loop 18 elongates or contracts. The gear 34 meshes with a pinion 35 to turn a spindle 36 to which the needle 37 swinging relative to a scale 38 is rigidly affixed. The scale 38 is suitably calibrated in degrees of temperature change, the needle moving from left to right as indicated by the small arrow as the temperature, to which the resistance 16 is subjected, increases. It will be seen that the loop 18 is constantly under light tension by means of the arrangement shown and that a slight elongation of the branch 17 or a slight contraction thereof, due to a rise or fall of current therethrough, will result in a slight movement of the arm 27. In such movement the pulley 25 will be caused to rotate, thereby turning the gear 34 and causing the gear 35 to swing the needle 37 relative to the scale 38.

Aside from the advantage of lightness and simplicity, the instrument is particularly practical for airplane installations and the like, due to the fact that it may be located at a point remote from the place where the medium, whose temperature is to be taken, is located.

Applicant has filed a divisional application, Serial No. 347,622, on March 16, 1929, which resulted in a Patent No. 1,784,922, issued December 16, 1930.

I claim:

1. In an electrical measuring instrument of the class described, the combination of a constant current branch and a variable current branch in parallel, said constant current branch comprising a fixed resistance, said variable current branch comprising a variable resistance, two conductor segments connected with said resistances, a common source of electric current for both branches of said parallel circuit, a scale, a means automatically operated relative to the scale by the conductor segments upon a change in the current flow through the variable resistance due to a change in temperature of the variable resistance.

2. In an electrical measuring instrument of the character described, a loop of fine wire, a movable pulley keeping said loop taut serving as one connection for the two branches of the loop, a variable resistance in circuit with one branch of the loop, a source of electric current for said resistance and loop, and means operated relative to a scale upon movement of said pulley.

3. In an electrical measuring instrument of the class described, the combination of a constant current branch and a variable current branch in parallel, said constant current branch comprising a fixed resistance, said variable current branch comprising a variable resistance, two conductor segments having a high temperature co-efficient of expansion and connected to said resistances, a common source of electric current for both branches of said parallel circuit, a scale, a means operated relative to the scale by the expansion or contraction of one of said segments due to a change in temperature of said variable resistance.

4. In an electrical measuring instrument of the class described, the combination of a constant current branch and a variable current branch in parallel, said constant branch comprising a fixed resistance, said variable branch comprising a variable resistance, two conductor segments having a high temperature co-efficient of expansion and connected to said resistances, one of said conductor segments being expanded or contracted by a temperature change in said variable resistance and a common source of electric current for both branches of said parallel circuit.

In testimony whereof I affix my signature.

JOSEPH W. ALLEN.